United States Patent

[11] 3,580,141

[72] Inventor Herbert Richter
 Beckum, Germany
[21] Appl. No. 754,247
[22] Filed Aug. 21, 1968
[45] Patented May 25, 1971
[73] Assignee Windmoller & Holscher
 Lengerich, Germany
[32] Priority Aug. 28, 1967
[33] Germany
[31] H60025

[54] APPARATUS FOR PAPER SACKS MANUFACTURE
 5 Claims, 4 Drawing Figs.
[52] U.S. Cl. .................................................... 93/8,
 198/31, 198/32, 198/205
[51] Int. Cl. .................................................... B31b 1/00
[50] Field of Search ........................................... 93/22, 23,
 14, 18, 26, 27, 8; 198/205, 31 (A3), 32

[56] References Cited
UNITED STATES PATENTS

| | | | |
|---|---|---|---|
| 1,959,662 | 5/1934 | Ellis | 198/20 |
| 2,053,263 | 9/1936 | Coty et al. | 93/22X |
| 3,373,664 | 3/1968 | Brockmuller | 198/31X |

*Primary Examiner*—Bernard Stickney
*Attorney*—Holman and Stern

ABSTRACT: A system of multiple conveyor belts designed to maintain a balance between the output of a tube-forming machine and a bottom-folding machine used in the manufacture of paper, plastic or similar sacks, in which an assemblage of conveyor belts having sufficient capacity for the piles of tubes produced by the tube-former acts as a magazine upon which the bottom-folder draws as required. Pivoting conveyor belts, directed by suitable monitoring devices, maintain a steady flow into and out of the magazine.

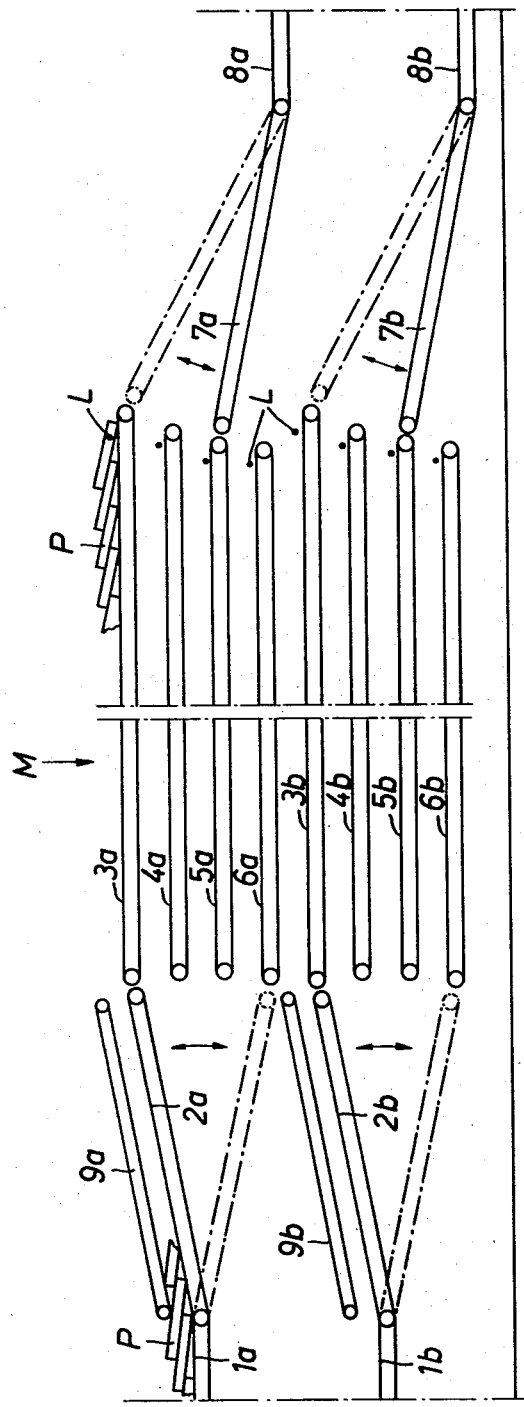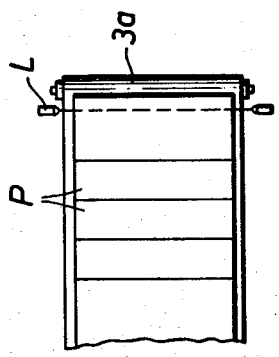

INVENTOR
HERBERT RICHTER

APPARATUS FOR PAPER SACKS MANUFACTURE

BACKGROUND OF THE INVENTION

The invention relates to apparatus for the production of sacks made of paper, plastic or the like, with a tube former and at least one bottom-folder and a conveyor arrangement carrying the tube sections in the form in piles to the bottom-folder.

In a known device of this kind, tube section piles are fed alternately to two continuously moving conveyor arrangement, each of which leads to a laying o position of the bottom-folder. Therein it has also been proposed to extend the conveyor arrangements in order thereby to achieve a stretch on which the gluing points on the sacks can dry. This entails an extension of the manufacturing plant with demands on valuable space. Since the length of such a drying stretch cannot be expanded at will, there is also only a certain time for the drying available which, in may cases, can be too short. The tube-forming machine and bottom-folder are, moreover, directly linked to one another so that their working rhythms must be attuned to one another.

It has also been proposed to transfer tube section piles to pallets or the like which are introduced into the laying on positions or the bottom-folding machines or conveyed to transit stores, from which they can be brought to the bottom-folding machine as necessary. This method has the disadvantage of interrupting the production line and furthermore it involves the necessity of a movement of separate pallets.

It is an object of the invention to overcome or reduce existing disadvantages and to form a multiple conveyor belt apparatus for sack making in such a way that, in the presence of a continuous production line, there is wide independence in the method of working of the tube-former and of the bottom-folder, that there is the least possible requirement for space, and that a long time-interval between the tube formation and the folding of the bottom may be attained.

SUMMARY OF THE INVENTION

The present invention consists in an apparatus for the production of sacks made of paper, plastic or the like with a tube-former and at least one bottom-folder and a conveyor arrangement which carries part completed sacks in the form of piles to a bottom-folder, in which the conveyor arrangement contains a magazine for the piles, the magazine consisting of endless conveyor member arranged above and/or alongside one another, the number of which member is greater than the number of the laying on positions of the bottom-folder.

In this way there is provided, with all the advantages of continuous production, means whereby the procedure can be fully mechanized or take place automatically, and the storage of a large number of tube section piles with relatively little space requirement can be carried out simultaneously. This carries the advantages that, first of all, the tube former and the bottom-folder or folders can work largely independently of one another and that further long time intervals are available as may be desirable or necessary for the drying of glued points.

There may be arranged, in front of the conveyor member forming the magazine at least one pivotable feed-belt and/or behind the conveyor members at least one pivotable collecting belt. The expression belt also includes here and at other places in this description a belt system or one or more other endless conveyor members. By the pivoting movement, a simple and rapid adjustment of the feed-belt or collecting belt into the correct position for working in conjunction with a conveyor member of the magazine is possible.

Advantageously, there is provided in each case above the feed-belt, a pressure belt which exerts a pressure on the tube section piles and therefore contributes to the bringing about of a firm connection at the glued points of the tube sections. At the same time, such a pressure belt holds the tube section piles in their position. Belts exerting a pressure can also be arranged according to the invention above the conveyor members of the magazine and possibly also above the collecting belts if this appears desirable.

There may be provided at the transit points between feed-belt and magazine conveyor member and/or between the latter and a collecting belt meshing groups of belts having a distance from one another in the transverse direction. In this it may refer to particular belts or to corresponding formations of the feed-belt, of the collecting belt and f of the magazine conveyor belts themselves. By this means, the tube section piles are supported and held in a particularly favorable way.

A convenient embodiment according to the invention consists further in the fact that at each conveyor member of the magazine is provided at least one sensing arrangement comprehending the occupation state thereto. The sensing arrangement can, for example, possess a feeler formed flexibly or as a pendulum which with an empty conveyor member takes up a first position and with an occupied conveyor member a second position, in which it is deflected by the tube section pile by a definite amount with respect to the first position. Instead of a feeler may also be provided advantageously a noncontact scanning, perhaps by mean of a light barrier.

By means of such sensing arrangement, the occupation position of the individual conveyor members of the magazine can be notified to a signal panel by means of lamps or indicators.

The invention further provides that the movement of the conveyor members of the magazine is controllable by means of the sensing arrangements. Thus, in particular, a signal can be given for the automatic stopping of the conveyor member when the foremost of the tube section piles deposited on the conveyor member arrives within the range of a feeler of a light barrier or the like arranged in the vicinity of the deliver end of the conveyor member.

The pivoting movement of a feed-belt and/or of a collecting belt may be controllable by means of the sensing devices associated with the conveyor members. In this, the embodiment can in particular be such that simultaneously with the stopping of the conveyor member initiated by the sensing arrangement, the pivoting drive of the feed-belt is activated in order to move it to the nearest free conveyor member. By making contact by means of a limit switch of the like, the pivoting movement of the feed-belt can be ended automatically and the drive of the conveyor member now to be occupied activated. This is correspondingly valid for the collecting belt or belts so that by simple means an automatic operation is possible.

The invention will now be described with reference to the accompanying drawings which illustrate the invention but in no restrictive sense.

BRIEF DESCRIPTION OF THE DRAWINGS

FIG. 1 shows an embodiment of the device according to the invention seen in part from the side schematically;

FIG. 2 is a plan view at the end of a conveyor member;

DETAILED DESCRIPTION OF THE INVENTION

Figure 3:
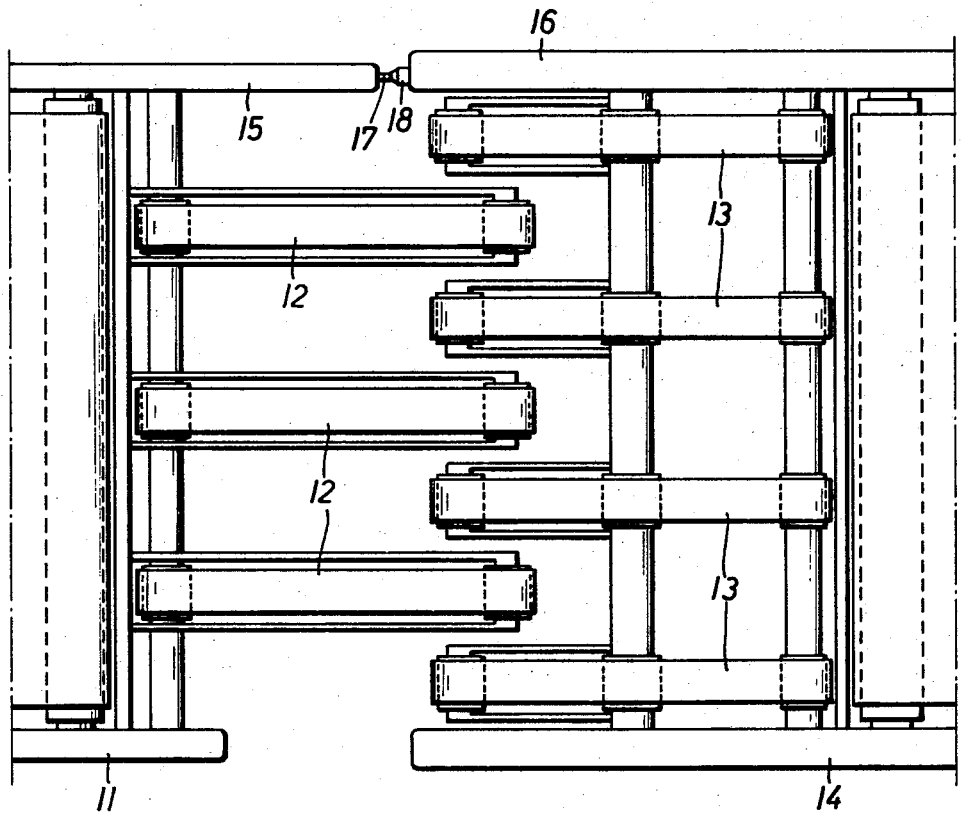
FIG. 3 illustrates the particular formation of a transit point in plan view.

The device represented in FIG. 1 is arranged between a known tube-forming machine (not shown) and a bottom-folding machine (likewise not specifically reproduced) so that there results in such a continuous production assembly. The tube sections produced in the tube-former are laid upon one another in each case in a definite number in piles. In the embodiment according to FIG. 1, these tube section piles are placed on two conveyor belts 1a, 1b. The loading of these two conveyor belts takes place in a known way by means of a switch point or the like.

With each conveyor belt 1a and 1b is associated, pivotable in the direction of the arrow, a feed-belt 2a and 2b leading to a magazine section of the device designated overall by M. The magazine section M attached thereto consists of a number of conveyor belts 3a, 4a, 5a, 6a and 3b, 4b, 5b, 6b, separately drivable, arranged one above another. The conveyor belts 3a to 6a are loaded by means of the feed-belt 2a and the feed-belts 3b to 6b by means of the feed-belt 2b. Correspondingly with the feed-belts 3a to 6a is associated a pivotable collecting belt 7a and with the conveyor belts 3b to 6b a pivotable collecting belt 7b. The latter lead to two conveyor belts 8a, 8b and consequently to two laying on positions of the bottom-folder (not itself shown). Over each feed-belt 2a, 2b is arranged a pressure belt 9a, 9b, by means of which a pressure can be exerted on the tube section piles.

The feed-belts 2a, 2b and the collecting belts 7a, 7b are mounted in each case at their ends turned away from the magazine section M and in other ways held in such a way that they can be pivoted in four positions with respect to the four conveyor belts associated therewith in each case. By the broken lines in FIG. 1 is indicated in each case a further one of these positions. The pivoting movement can take place, for example, by means of hydraulic cylinders, by an electric motor through a geared drive or with other suitable means. The mountings of the belts are formed correspondingly. They can be connected directly with the drive elements or through intermediate members. Thus, for example, there can be an adjustable support or else suspension by mean of tensioning members.

In the position of the individual parts of the device represented in FIG. 1, tube-section piles P are fed by means of the two feed-belts 2a, 2b to the uppermost conveyor belt 3a, 3b of the two groups of the magazine section M, while the collecting belts 7a, 7b take the tube-section piles from the conveyor belts 5a, 5b and feed them to the laying on positions of the bottom-folder. Up to this time, the conveyor belts 4a, 4b are empty.

With each of the conveyor belts is associated a light barrier L (cf. also FIG. 2) which is arranged in the vicinity of laying on delivery end in the path of the tube-section piles and provides evidence whether the conveyor belt is occupied at this point or not. Advantageously, such a light barrier attaches to a control for the automatic progress of the laying-on and removal processes. The control can be constructed by the use of elements and circuits known per se so that it operates as follows.

If the conveyor belt 3a in FIG. 1 is fully occupied, then the light barrier L responds. By this means, a signal is given for stopping the drive of the conveyor belt 3a, a signal for pivoting the feed-belt 2a in the position facing the empty conveyor belt 4a and a signal to start this last named conveyor belt 4a. This process repeats itself correspondingly in each case, whereby finally, after the occupation of the lowest conveyor belt 6a of this group, the feed-belt 2a is again pivoted upwards to the uppermost conveyor belt 3a. The whole process may be programmed or take place by means of sequence control.

The course of the collecting processes takes place similarly. If, for example, in the represented position of the parts, the last tube section pile present on the conveyor belt 5a has been taken over from the collecting belt 7a, then, by the response of the relative light barriers, signals are given for stopping the conveyor belt 5a for the downward pivoting of the collecting belt 7a as far as the conveyor belt 6a and for setting in motion this conveyor belt 6a.

This applies correspondingly for the lower group of conveyor belts 3b to 6b with the feed-belt 2b and the collecting belt 7b.

Figure 4:
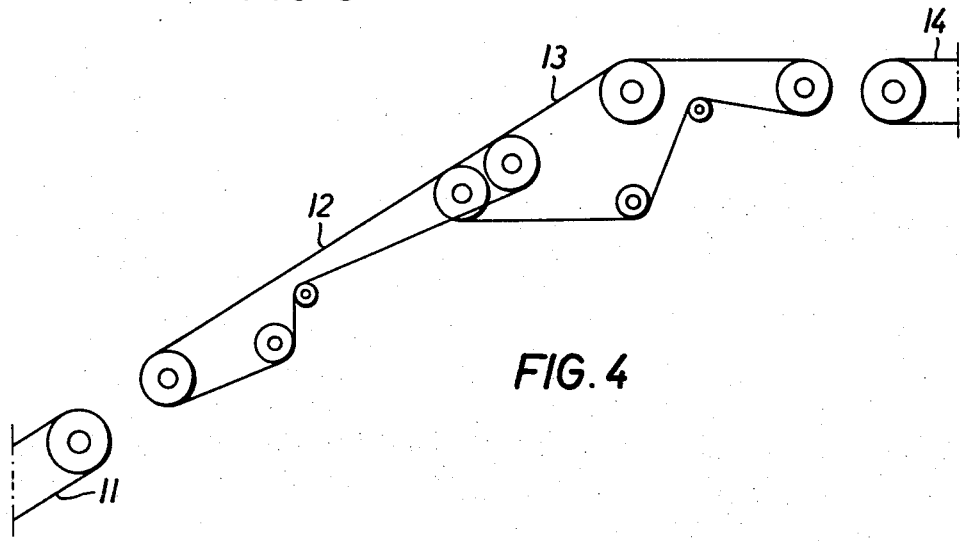
FIG. 4 is a diagrammatic side elevation in relation to FIG. 3.

FIGS. 3 and 4 show an embodiment in which a feed-belt 11 continues in a group of individual belts 12 which intermesh with belts 13 of a group of belts preconnected in each case to a conveyor belt 14. By means of the meshing of the two groups of belts, a definite overlapping in the longitudinal direction is achieved which is particularly favorable for the support of the tube-section piles and for the transfer process.

In this case, the invention also includes the possibility to give to the belts 13, perhaps independence on the response of a light barrier of the kind shown in FIGS. 1 and 2, an increased speed for a short time in order thereby to withdraw the last tube-section pile to be transferred more quickly from the belts 12. It may also be of advantage occasionally to form the mounting of the belts 13 or a part thereof pivotably so that, for example, the last tube-section pile to be transferred can be lifted from the forward moving belts. This process may then be controlled likewise depending on the state of occupation of the relative belt.

On mounting or frame parts 15 and 16 of the feed-belt 11 coming to rest opposite one another and the conveyor belt 14, switching elements are provided, for example, a limit switch 18 on the one and an actuating cam 17 on the other part, which can serve for ending the pivoting movement of the feed-belt 11 in the desired position, to place the conveyor belt 14 in motion or to start other processes.

In addition to the superposed arrangement of magazine conveyor belts, an alongside arrangement of such belts is also possible, wherein then, for example, pivotable feed and collecting belts can be present in the horizontal plane.

I claim:

1. In an apparatus for the production of sacks having a tube-former, at least one bottom-folder provided with a number or feeding stations and a conveyor arrangement interposed between the tube-former and the bottom-folder for conveying piles of tube sections delivered by the tube-former to the bottom-folder, said conveyor arrangement including a magazine having an entrance end and an exit end, said being adapted to store the piles and comprising a plurality of storing conveyors, the number of which is greater than the number of feeding stations of the bottom-folder, each of said storing conveyors being provided with sensing means determining the occupation situation of the storing conveyors, at least one feed-in conveyor arranged at the entrance end of the magazine and pivotable so as to selectively cooperate with one of the storing conveyors in dependence on the occupation situation thereof, and at least one feed-off conveyor arranged at the exit end of the magazine and pivotable so as to selectively cooperate with one of the storing conveyors in dependence on the occupation situation thereof.

2. The apparatus according to claim 1, characterized in that associated with the or each feed-in conveyor is a pressure belt.

3. The apparatus according to claim 1 in which said storing conveyors and said feed-in and feed-off conveyors provide endless belts and in which at the transfer positions between said feed-in conveyors and said storing conveyors and/or between the latter and, said feed-off conveyors meshing groups of said belts are provided distanced from one another in the transverse direction.

4. The apparatus according to claim 1, characterized in that the movement of the storing conveyors is controllable by means of the sensing means.

5. The apparatus according to claim 1, characterized in that the pivoting movement of said feed-in conveyor and/or of said feed-off conveyor isle by means of the sensing means associated with the storing conveyors.